Dec. 27, 1949   F. E. BROWNING   2,492,521
LAWN MOWER
Filed May 16, 1947
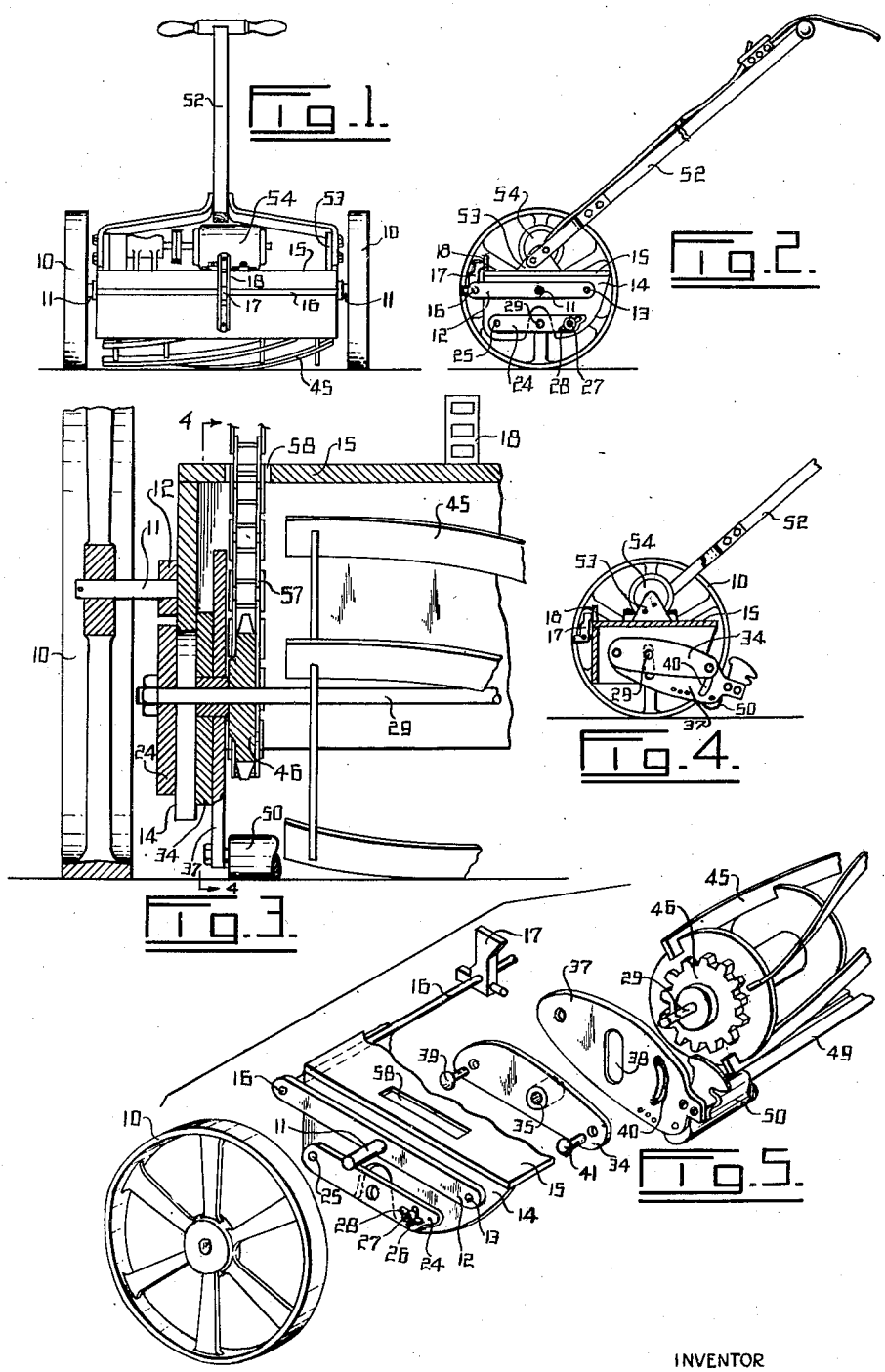
INVENTOR
FREDERICK EDWARD BROWNING
BY
Fetherstonhaugh & Co.
ATTORNEYS

Patented Dec. 27, 1949

2,492,521

UNITED STATES PATENT OFFICE 2,492,521

LAWN MOWER

Frederick Edward Browning, Vancouver, British Columbia, Canada

Application May 16, 1947, Serial No. 748,387

6 Claims. (Cl. 56—26)

This invention relates to improvements in lawn mowers.

An object of the present invention is the provision of a lawn mower in which the cutting mechanism is so mounted that it floats over the ground, that is, it rides over uneven ground without digging into it and without transferring the motion to the handle.

Another object is the provision of a lawn mower in which the cutting blades are rotated by power, and in which the bed knife may be easily adjusted in relation to said blades.

A further object is the provision of a mower of the type described which may be instantly adjusted to cut grass to various lengths.

With these and other objects in view, the present invention consists essentially of a lawn mower comprising a pair of side wheels, a transverse shaft carried by the wheels, a blade reel mounted on the shaft, means for rotating the blade reel, and a transverse bed knife pivotally suspended from the shaft adjacent the reel as more fully described in the following specification and illustrated in the accompanying drawings, in which Figure 1 is a front elevation of the lawn mower, Figure 2 is a side elevation with the near wheel removed, Figure 3 is an enlarged fragmentary transverse section, Figure 4 is a cross section taken on the line 4—4 of Figure 3, and Figure 5 is an exploded view of the parts of one side of the device.

As the construction of this machine is the same on both sides, only one side will now be described in detail for the sake of clarity. A side wheel 10 is rotatably mounted on a stub shaft 11 which projects outwardly from a cross bar 12 substantially midway between the ends thereof. The forward end of this bar is free while the rearward end is pivotally mounted at 13 on a vertical side flap 14 of a substantially horizontal platform 15 extending from side to side of the machine and having a flap at each end thereof. The free end of the bar 12 is connected to the corresponding bar on the other side by a bar 16 which extends along and is spaced from the front of the platform. This rod has a latch 17 which removably engages any one of a plurality of notches in a standard 18 mounted on the front edge of the platform adjustably to retain the latter in position.

An adjusting arm 24 is pivotally mounted at its forward end on the outer surface of the flap 14 near its front edge by a pin 25. The rearward end of the adjusting arm has an arcuate slot 26 formed therein, through which a bolt 27 extends from the side flap. An adjusting nut 28 is threaded on this bolt to hold the arm 24 in position. A shaft or axle 29 is secured to the adjusting arm approximately half way between its ends and extends transversely the machine to the opposite adjusting arm. This shaft may be fixed to these arms, as shown, or it may be journalled in bearings carried thereby.

An adjusting plate 34 is located inside the flap 14 and has a central bearing 35 through which the shaft 29 rotatably extends. A side plate 37 is mounted inside the plate 34. This side plate has an elongated slot 38 formed therein through which the shaft 29 freely extends. This side plate is pivotally connected to the adjusting plate at their forward ends by a pin 39. The side plate has an arcuate slot 40 near its after end through which an adjusting bolt 41 extends from the plate 34 adjustably to hold said plates together.

A blade reel 45 of any desired type of construction is rotatably mounted between the opposed side plates 37 on the shaft or axle 29 if the latter is fixed, or if it is rotatable, said reel is fixed thereto. A sprocket 46 on the shaft is mounted to rotate the blade reel either by being connected thereto or fixed to the shaft, depending upon whether or not the latter is rotatable. A transverse bed knife 49 is carried by the plates 37 immediately below the reel 45, and cooperates therewith to cut the grass in the usual manner. A roller 50 is also carried by the side plates behind the bed knife and is adapted to roll over the ground or grass.

A handle 52 is pivotally carried by the brackets 53. An electric motor 54 is mounted on the platform 15 and is connected to rotate the blade reel in any suitable manner. If desired, a gasoline motor may be substituted for this electric motor. In this example, a sprocket 56 is rotated by the motor, and this sprocket is connected to the sprocket 46 by a chain 57 which extends through a slot 58 in the platform.

While a hand-operated lawn mower is shown, it is to be understood that it might be a power machine, in which case, the motor would be operatively connected to the wheels in any suitable manner.

In operation, the motor 54 turns the blade reel 45 to cut the grass in the usual way as the mower is moved over said grass. The rotation of the reel assists the movement of the mower.

As the roller 50 rides over uneven ground, the bed knife 49 moves with it without changing its setting in relation to the cutting blades and without moving the latter because the side plates 37 are fixed to the adjusting plates 34 which actually are rotatably mounted on the shaft 29, the axle for the blades. The length of the cut grass is not materially changed, and the handle 52 is not affected by this movement. If it is desired to change the setting of the bed knife, it is only necessary to loosen the bolts 41 and shift the side plates to move said knife towards or away from the blades, said side plates pivoting on the pins 39.

The chain 57 may be tightened or loosened by loosening the nut 28 and lowering or raising the platform on its pivots 25. The adjusting arms 24 carry the shaft 29 and all the other elements depending therefrom.

It is a very simple matter to set the machine to cut the grass at any desired height above the ground. The latch 17 is released and the platform raised or lowered on the pivots 13. This raises and lowers the entire apparatus in relation to the stub shafts 11 which are always retained the same distance above the ground by the wheels 10. When the platform is adjusted in this manner, the forward ends of the side plates 37 are raised or lowered and while the roller 50 remains on the ground, said plates pivot on it so that the bed knife is raised or lowered.

I claim:

1. A lawn mower comprising a pair of side wheels, a platform carried by the wheels, a transverse shaft suspended from the platform, a blade reel mounted on the shaft, a motor mounted on the platform operatively connected to the blade reel to rotate the latter, a transverse bed knife suspended from the shaft adjacent the reel, and a roller mounted behind the bed knife to move therewith, said roller being adapted to rest on the ground.

2. A lawn mower comprising a pair of side wheels, a stub shaft for each wheel upon which it rotates, a cross bar connected substantially midway between its ends to each stub shaft, a platform pivotally mounted at its rear edge on the rearward ends of said cross bars, means for adjustably connecting the forward edge of the platform to the forward ends of the cross bars, a transverse shaft adjustably suspended from the platform, a blade reel mounted on the shaft, a motor mounted on the platform operatively connected to the blade reel to rotate the latter, a transverse bed knife supported adjacent the reel independent of the platform, and a roller mounted behind the bed knife.

3. A device according to claim 2 in which the means for connecting the forward edge of the platform to the forward edges of the cross bars, comprises a rod connecting the ends of the bars, said rod being spaced from the front of the platform and a latch on the rod, said latch being adapted removably to engage any one of a plurality of notches on the platform.

4. A lawn mower comprising a pair of side wheels, a stub shaft for each wheel upon which it rotates, a cross bar connected substantially mid way between its ends to each stub shaft, a platform pivotally mounted at its rear edge on the rearward ends of said cross bars, means for adjustably connecting the forward edge of the platform to the forward ends of the cross bars, a transverse shaft adjustably suspended from the platform, a blade reel mounted on the shaft, a motor mounted on the platform operatively connected to the blade reel to rotate the latter, a transverse bed knife suspended from the shaft adjacent the reel independent of the platform, and a roller mounted behind the bed knife to move therewith, said roller being adapted to rest on the ground.

5. A lawn mower comprising a pair of side wheels, a stub shaft for each wheel upon which it rotates, a cross bar connected substantially mid way between its ends to each stub shaft, a platform pivotally mounted at its rear edge on the rearward ends of said cross bars, means for adjustably connecting the forward edge of the platform to the forward ends of the cross bars, a transverse shaft adjustably suspended from the platform, a blade reel mounted on the shaft, a motor mounted on the platform operatively connected to the blade reel to rotate the latter, adjusting plates pivotally mounted substantially midway between their ends on the shaft on each side of the reel, a side plate beside each adjusting plate pivotally connected thereto at their forward ends, said side plates having elongated slots therein through which the shaft freely extends, means for adjustably securing said plates together at their rearward ends, a transverse bed knife carried by the side plates adjacent the reel, and a roller mounted on said side plates behind the bed knife adapted to rest on the ground.

6. A lawn mower comprising a pair of side wheels, a platform carried by the wheels, an adjusting arm pivotally mounted at its forward end on each side of the platform, means for adjustably connecting the opposite ends of the adjusting arms to the platform, a transverse shaft carried by the adjusting arms substantially mid way between the ends thereof, a blade reel mounted on the shaft, a sprocket on the shaft for rotating the reel, a motor on the platform, a sprocket adapted to be turned by said motor, a chain connecting the two sprockets, a transverse bed knife suspended from the shaft adjacent the reel, said bed knife being free of the adjusting arms, and a roller mounted behind and connected to the bed knife.

FREDERICK EDWARD BROWNING.

REFERENCES CITED

The following references are of record in the file of this patent:

UNITED STATES PATENTS

| Number | Name | Date |
| --- | --- | --- |
| 1,315,977 | McLain | Sept. 16, 1919 |
| 2,197,264 | Cooper | Apr. 16, 1940 |

FOREIGN PATENTS

| Number | Country | Date |
| --- | --- | --- |
| 113,287 | Australia | June 9, 1941 |
| 379,462 | Great Britain | Sept. 1, 1932 |